SYNCHRONISATION OF PULSE CODE MODULATION TRANSMISSION SYSTEMS

Filed Jan. 22, 1963 4 Sheets-Sheet 1

Feb. 28, 1967 B. D. SIMMONS ETAL 3,306,978

SYNCHRONISATION OF PULSE CODE MODULATION TRANSMISSION SYSTEMS

Filed Jan. 22, 1963 4 Sheets-Sheet 2

Feb. 28, 1967 B. D. SIMMONS ET AL 3,306,978

SYNCHRONISATION OF PULSE CODE MODULATION TRANSMISSION SYSTEMS

Filed Jan. 22, 1963 4 Sheets-Sheet 3

SYNCHRONISATION OF PULSE CODE MODULATION TRANSMISSION SYSTEMS

Filed Jan. 22, 1963 4 Sheets-Sheet 4

United States Patent Office 3,306,978

Patented Feb. 28, 1967

3,306,978

SYNCHRONISATION OF PULSE CODE MODULATION TRANSMISSION SYSTEMS

Brian Desmond Simmons, Chislenhurst, Kent, and Winston Theodore Duerdoth, London, England, assignors to Associated Electrical Industries Limited, London, England, a British company, and Her Majesty's Postmaster General, London, England Filed Jan. 22, 1963, Ser. No. 253,165
Claims priority, application Great Britain, Feb. 9, 1962, 5,119/62
11 Claims. (Cl. 179—15)

This invention relates to pulse code modulation (P.C.M.) transmission systems in which speech or other information is coded in digital form for transmission. Coded informaiton for a number of channels is transmitted in each of a succession of "time frames" the totality of digit periods in each of which (a digit period being a time period allocated for the transmission of a single digit) is divided into a number of "time slots" the digital contents of which depend on the particular mode of assembling the digital information for transmission. In one mode, sometimes called the "slot" method, each channel has a particular time slot allocated to it in each frame and each slot contains a number of digit periods at least equal to the number of digits which constitute a single code group. For instance in a 24-channel system using an 8-digit P.C.M. code, a frame would comprise at least 24 time slots each containing at least 8 digit periods, each time slot being allocated to a particular channel identified by the position of this time slot in the frame. (For synchronisation or signalling purposes the system may include an additional channel or an additional digit period in the time slots.) In another mode, sometimes called the "comb" method, each channel has allocated to it a particular digit period in each slot (so that each time slot contains a number of digit periods at least equal to the number of informtion channels) and the number of time slots in a frame is equal to at least the number of digits in a code group, the digits of a single code group for a particular channel being contained in respective digit periods in different time slots of a single frame. For instance again considering a 24-channel system using an 8-digit P.C.M. code, there would be at least 24 digit periods in each time slot and at least 8 time slots in a frame, corresponding digit periods for the several time slots, for instance the first digit period in each, being allocated to a particular channel identified by the position in the time slots of the relevant digit periods.

In a P.C.M. transmission system the transmitting and receiving stations, which may for example be telephone exchanges linked by the P.C.M. transmission, can include their own timing pulse generators which generate various sequences of pulses demarcating at least the time slots within each frame and the digit periods within each time slot. These pulses are used for controlling coding and decoding at terminal stations and for controlling reception and re-transmission at intermediate switching stations. Whether or not the timing pulse generators at the several stations function isochronously, and despite the fact that each transmitted frame may and usually does include a synchronising signal for use at the receiving end, there exists at any station which has P.C.M. transmission links with a number of other stations a basic problem of bringing the time slots of an incoming P.C.M. transmission into time alignment, that is, time coincidence, with the locally demarcated time slots.

This problem arises because of the different propagation times over the links, aggravated by the fact that the propagation time over any particular link is liable to variation, for instance due to temperature changes in the case of a cable link. This problem can be solved by subjecting the incoming P.C.M. transmission to a variable additional delay in the receiving station such as to make the total delay suffered by the transmission equal to the period of a complete frame or of an integral number of complete frames should the link delay be greater than the period of a single frame. For providing this additional delay it has previously been proposed to employ a continuously variable delay element, in particular a magnetostrictive delay line with a motor-driven reading head which can be moved along the delay line so as to adjust the length of it which is effective and therefore to vary the additional delay imposed on the incoming transmission. In this prior proposal the motor driving the adjustable head is controlled by a comparator in accordance with the relative timing between the synchronising signals of an incoming transmission on the one hand and the locally generated timing pulses on the other hand, so that the head is automatically adjusted to compensate for any variation of the propagation delay in the incoming link. It will be appreciated that an increasing propagation delay will require a decreasing additional delay and vice versa.

A disadvantage of this prior proposal is that because of the movable parts required for a continuously variable delay line with motor-driven heads, such delay lines are relatively expensive items and may be rather difficult to design and manufacture so as to function reliably and consistently. An object of the present invention is to achieve the same end without requiring continuously variable delay elements such as delay lines with adjustable heads.

According to the invention a P.C.M. transmission receiver includes, for bringing the time slots of a received transmission into time alignment with locally demarcated time slots, delay means affording a plurality of predetermined delays, delay selecting means for selectively connecting in series with an incoming transmission a selection of said delays (one or more) of total magnitude sufficient to bring the time slots of said transmission into leading overlapping time relationship with respective locally demarcated time slots, storage means following said delay means for temporarily storing digits contained in the digit periods of a received time slot, and means for abstracting said digits from the storage means coincidentally with locally demarcated digit periods.

By a leading overlapping time relationship of an incoming time slot with respect to a locally demarcated time slot is meant that the two time slots partially coincide with each other in time with the digit periods of the incoming time slot occurring earlier than the respectively corresponding digit periods of the locally demarcated time slot. The abstraction of the digits from the storage means coincidentally with the locally demarcated digit periods finally brings the digits of the incoming time slot into coincidence with the digit periods of the locally demarcated time slot. The time slots thus brought into time alignment need not necessarily correspond as regards their time positions in their respective frames: however if they do correspond, then not only slot alignment but also frame alignment is achieved.

Especially where frame alignment is required there may be connected in series with the incoming transmission an additional predetermined delay of such magnitude that the sum of this additional delay plus the maximum anticipated propagation delay approximates to a whole number of time frames.

In carrying out the invention the delay selecting means may include means for detecting variation of the time relationship of the overlapping time slots in either sense from a normal operational relationship and for causing a new selection of said delays to be connected in series with the incoming transmission (whereby to modify the total delay in series with the incoming transmission in the sense to tend to restore a normal operational relationship of the over-lapping time slots) in response to a detected variation of a certain magnitude not greater than can be tolerated without risk of mutilation or loss of the digital information stored in the storage means and subsequently abstracted therefrom.

The selectively connectible delays afforded by the delay means would preferably each correspond to a whole number of digit periods so chosen that the total delay can be modified by successive discrete amounts having an average magnitude of half a time-slot period, being to this end equal to half the period of a time slot if the number of digit periods per time slot is even, and alternately equal to half a digit period more and half a digit period less than half the period of a time slot if the number of digits per time slot is odd. For instance with 8 digit periods per time slot as in the "slot" method example quoted above, the delays afforded by the delay means would be so chosen as to permit the total delay to be changed by an amount equal to 4 digit periods at a time, whereas with 25 digit periods per time slot as in the quoted "comb" method example successive changes of total delay would be by amounts equal to 12 and 13 digit periods alternately.

The nature of the invention may be more fully understood from the following description of the accompanying drawings, in which.

Figure 1:
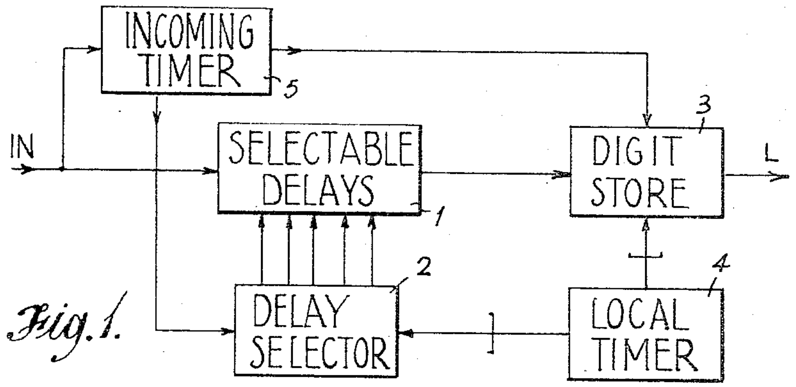
FIG. 1 is a block diagram of a time slot aligning arrangement according to the invention.
Figure 3:
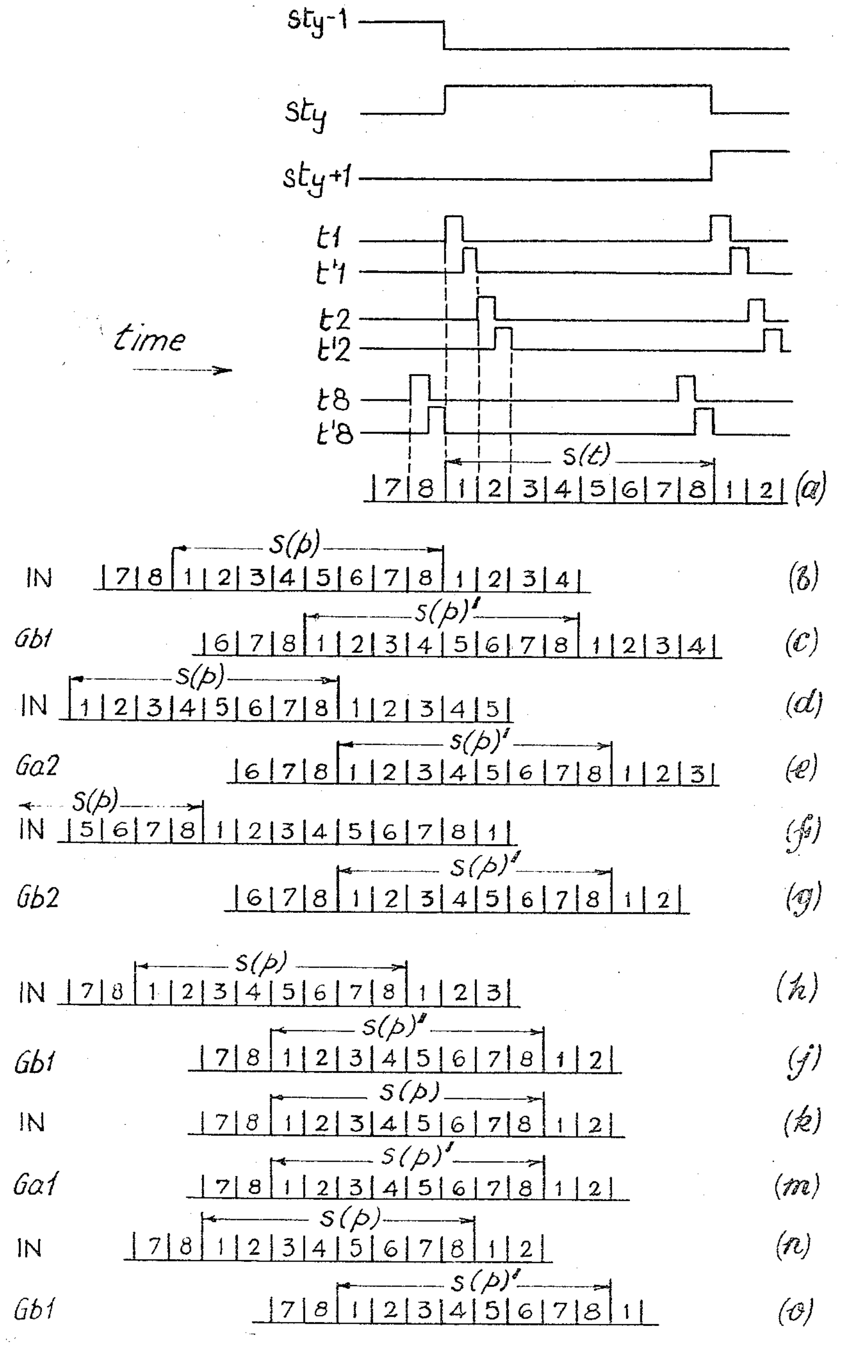
FIG. 3 is a time diagram which will be referred to in describing the operation of the arrangement of FIG. 2.

Referring to FIG. 1, a P.C.M. transmission receiving station according to the invention comprises a delay means 1 affording a plurality of selectable delays, a delay selector 2 and a digit store 3 from which stored digits can be read out under the control of a local timer 4, the latter being a pulse generator which produces sequences of pulses demarcating time slots within a frame (pulses *st*, FIG. 3) and digit periods within each time slot (pulses *t*, FIG. 3). The purpose of this combination of means is to present at L, in time coincidence with a locally defined time slot, the digital information contained in a time slot of an incoming transmission, received at IN, which has been subject to variable propagation delay. To this end, the incoming transmission is taken to the digit store 3 through a number of delays selected from the delay means 1 by the delay selector 2 in dependence on the time relationship between pulses generated by the local timer 4 and an incoming timer 5, the total magnitude of the selected delays being such as to bring the incoming time slot into leading overlapping time relationship with a locally demarcated time slot as hereinbefore explained. Typically this relationship may be that between the locally demarcated time slot S(*t*) represented at (*a*) in FIG. 3 and the delayed incoming time slot S(*p*)′ represented at (*c*) in that figure. The digits in the incoming time slot concerned are individually stored in the digit store 3, being distributed into individual storage elements under control of the incoming timer 5 which, under control of incoming synchronising signals, produces in like manner to the local timer 4 sequences of output pulses demarcating the incoming digit periods and, where necessary, the incoming time slots. Usually a separate incoming timer would be required for each incoming transmission, but only a single local timer would be necessary.

Figure 2:
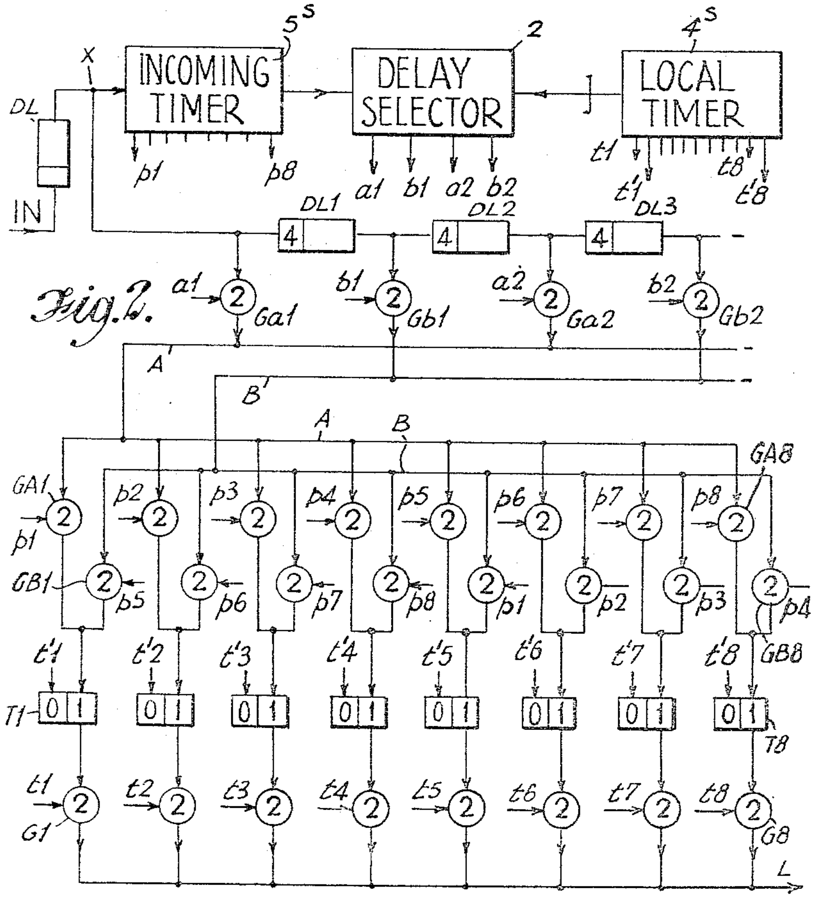
FIG. 2 is a so-called logical diagram of a suitable form of digit store preceded by selectable delays, the "slot" method of information assembly being assumed for this figure.
Figure 8:
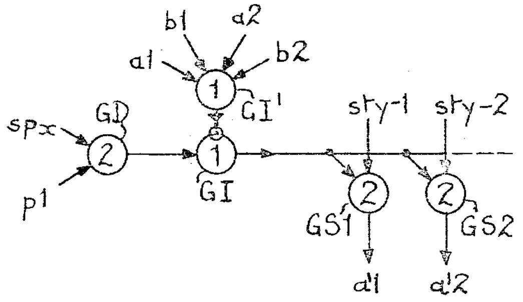
FIG. 8 is a logical diagram illustrating how initial delay selection may be achieved.

For FIG. 2 and 8-digit P.C.M. code and "slot" method of information assembly has been assumed, so that each time slot has eight digit periods. For the incoming transmission these digit periods are demarcated by pulse trains *p*1 . . . *p*8 produced by the incoming timer 5s synchronously with the incoming transmission. The pulses in these pulse trains (not shown in the time diagram of FIG. 3) coincide in time with the respective digit periods 1–8 in the incoming time slots such as S(*p*) (FIG. 3). The local timer 4s produces pulse trains *t*1 . . . *t*8 demarcating the digit periods 1–8 of a locally demarcated time slot S(*t*) (FIG. 3) with which an incoming time slot S(*p*) has to be brought into coincidence.

Referring to FIG. 2, the incoming transmission appearing at IN is applied to a chain of delay elements DL1, DL2, DL3 . . . from a point X which may be preceded, especially where frame alignment is to be achieved, by a fixed delay element DL having a delay which, having been predetermined according to the maximum propagation delay anticipated in the incoming link, provides a coarse timing adjustment such that the total delay suffered by the transmission before it reaches the point X approximates to a complete frame period. In what follows the incoming transmission will be considered as at point X, whether delayed by an element such as DL or not. The synchronising signals controlling the local time 5s are taken from point X and are assumed to control the generation of pulse trains *p*1 . . . *p*8 without further delay. The delay selector 2 selects from the chain DL1 . . . , by means of selecting gates **G*a*1, G*b*1, G*a*2, G*b*2** . . . , the number of delay elements (none, one or more) required at any time to bring an incoming time slot such as S(*p*) into leading overlapping relationship with a locally defined time slot such as S(*t*). Possible forms for the delay selector 2 are described later. For the moment it is sufficient to say that it functions by opening one or another of gates **G*a*1, G*b*1, G*a*2, G*b*2** . . . , as represented in logical symbolism by the appendency to these gates of inputs *a*1, *b*1, *a*2, *b*2 . . . corresponding to similarly referenced outputs of the delay selector 2.

Alternate gates **G*a*1, G*a*2 . . . are connected on their output side to a highway A, and the remaining gates G*b*1, G*b*2 . . . are likewise connected to a highway B. Assuming that each of the delay elements DL1, DL2, DL3 . . . affords a delay of four digit periods (half a time slot), then an incoming digit passed by one of the gates G*a*1, G*b*1, G*a*2, G*b*2** . . . will appear on one or other of the highways A or B. A digit appearing on highway A will be in its own digit period within a time slot: a digit on highway B will be displaced from its own digit period within a time slot by four digit periods (that is, by half a time slot).

The highway A, on which the digits appear in their own digit periods, goes to a set of gates GA1 . . . GA8 opened by the digit period pulses *p*1 . . . *p*8 respectively, while the other highway, B, goes to a set of gates GB1 . . . GB8 each opened by a digit period pulse four digit periods displaced from that which opens the corresponding gate in set GA1 . . . GA8. For instance gate GA1 in the first set is opened by the *p*1 pulses from the incoming timer, whereas the corresponding gate GB1 in the second set is opened by the $p(1+4)=p5$ pulses. Corresponding gates such as GA1 and GB1 from the two sets GA1 . . . GA8 and GB1 . . . GB8 constitute a pair of input (setting) gates for a corresponding bistable element such as T1 in a set of such elements T1 . . . T8 constituting respective digit storage elements for the digit stores 3 of FIG. 1. For reading the storage elements T1 . . . T8 they have respective output gates G1 . . . G8, which are respectively opened by the digit period pulses $t1$ . . . $t8$ generated by the local timer $4^s$. The gates G1 . . . G8 on their output sides are connected in common to highway L. Storage elements T1 . . . T8 are reset by pulses in further pulse trains $t'1$ . . . $t'8$ obtained from the local timer $4^s$. These latter pulses occur in the same respective digit periods as do the pulses $t1$ . . . $t8$ but each in a later part of the pertinent digit period. Thus each locally demarcated digit period may be defined as to its first half by a $t$ pulse (for example $t1$) and as to its second half by the corersponding $t'$ pulse ($t'1$). Each pair of $t$ and $t'$ pulse sequences can readily be obtained, for example, by frequency division in a binary element of pulses occurring at a frequency of twice the digit period repetition frequency, the required pulse sequences at digit frequency being taken from opposite sides of the binary element, or by deriving each $t'$ pulse from the corresponding $t$ pulse through a delay element affording a delay of half a digit period.

A digit cannot be read out of any one of the storage elements T1 . . . T8 at the same time as it is being written in: in other words the $t$ pulse which reads any one of the storage elements T1 . . . T8, namely pulse $t1$ for element T1, must not coincide with a digit period (as defined by pulse $p1$ or $p5$ for element T1) in which a digit pulse may reach that element from the relevant GA or GB gate. There must therefore be a time displacement between the writing and reading of a digit, and by resetting the elements T1 . . . T8 by pulses $t'1$ . . . $t'8$ which occur later in the same digit periods as those in which the stored digits are read out via gates G1 . . . G8 by pulses $t1$ . . . $t8$, a displacement of only one digit period is permissible.

As a starting point for consideration of the operation of the overall arrangement, let it be assumed that delay element DL1 has been connected in series by the opening of gate G$b$1, so as to bring an incoming time slot S(p) (FIG. 3(b)) into leading overlapping time relationship (as at S($p$)′ in FIG. 3($c$)) with a locally demarcated time slot S($t$) (FIG. 3($a$)). The digits in the incoming time slot S($p$)′, as delayed in element DL1 appear at gates GB1 . . . GB8 and are individually passed by these gates to the respective storage elements T1 . . . T8. This result is obtained because the digits as they appear at the gates G1 . . . G8 are displaced by an odd multiple of four digit periods from their own digit periods and therefore coincide with the opening pulses applied to these gates. The digits as thus stored in elements T1 . . . T8 in digit periods defined by $p5$ . . . $p8$ . . . $p4$ are read out by pulses $t1$ . . . $t8$ at a later time in each case. (Compare FIG. 3($c$) and ($a$)). This is followed by resetting of the elements T1 . . . T8 by pulses $t'1$ . . . $t'8$, ready to accept the digits of the next time slot. The digits of the time slot S($p$) as they appear on highway L are now in time coincidence with the digit periods of the time slot S($t$), that is, the incoming time slot has been brought into exact alignment with the locally demarcated time slot.

If the propagation delay now decreases, the earlier arrival of the incoming time slot S($p$) can be absorbed at the storage elements T1 . . . T8, by an increasing displacement between writing and reading times, until a limit of seven digit periods displacement is reached. This is equivalent to a one digit period displacement (because an eight period displacement would give coincidence of writing and reading) and occurs when, say, the eighth digit period of the time slot S($p$)′, as it appears at the output of gate GB8, coincides with the first digit period of the locally demarcated time slot S($t$). More generally, this limit occurs when any particular storage element (T$n$) is being read out when the preceding storage element (T$n$—1) is being written into. At this limit the time position of the delayed incoming time slot S($p$)′ as represented at ($c$) in the timing diagram of FIG. 3 will have drifted three digit periods to the left in this diagram, the time position of the incoming slot (as at point X) being now that represented at ($d$). The delay selector 2 responds to this time relationship and now primes gate G$a$2 instead of G$b$1, so as to introduce delay element DL2. This brings the incoming time slot, as it appears at the output of gate G$a$2, to the time position of FIG. 3($e$). The digits of the incoming time slot are now written into the elements T1 . . . T8 by pulses $p1$ . . . $p8$ at gates GA1 . . . GA8, and read out as before by pulses $t1$ . . . $t8$, the displacement between writing in and reading out being now three digit periods. (Compare FIG. 3($e$) and ($a$).)

Consideration of FIG. 2 will show that following the introduction of an extra delay element (DL2 in this instance) the last four digits to have been written into their respective stores will again be written in to the same stores four digit periods later. For instance if element DL2 is introduced at $p1$ time, the digits written into elements T1 . . . T4 from highway B in the preceding $p5$ . . . $p8$ times via gates GB1 . . . GB4 will reappear on highway A four digit periods later and will therefore be again written into elements T1 . . . T4 because they now coincide with the pulses $p1$ . . . $p4$ applied to gates GA1 . . . GA4. By over-writing into the storage elements in this way, the local timer is in effect allowed to catch up by four digit periods and no loss or mutilation of the digits occurs.

With continuing decrease of propagation time, a further delay element (DL3) has to be introduced when the limit of permissible time displacement is again reached, which will be when the incoming time slot S($p$) has the relative time position represented in FIG. 3($f$). With delay element DL3 introduced by the delay selector 2, which to this end now primes gate G$b$2 instead of G$a$2, the delayed time slot S($p$)′, is brought, at the output of gate G$b$2, to the relative time position of FIG. 3($g$). If further delay elements are provided, a similar procedure is followed with continuing decrease of propagation delay until all the delay elements DL1, DL2, DL3 . . . are in series. With correct provision of delay elements, this will correspond to the lower anticipated limit of the propagation delay.

Consider now an increase of propagation delay from the condition represented by FIG. 3($d$) and ($e$). Such increase can be again permitted until a limit of one digit period displacement between writing and reading of the storage elements T1 . . . T8 is reached, which will be when, say, the second digit period of the delayed incoming time slot S($p$)′ coincides with the first digit period of the locally demarcated time slot S($t$). The time position of the incoming time slot S($p$) will then be as in FIG. 3($h$). The delay selector 2 responds to this time relationship and primes gate G$b$1, at the output of which the incoming time slot appears on highway B in the time position of FIG. 3($j$). It is arranged that following this priming of gate G$b$1, the gate G$a$2 is kept primed by the delay selector for a further four digit periods, after which its priming is removed to remove element DL2. During the four digit period overlap, at the same time as a group of four digits is being written into four of the storage elements T1 . . . T8 via gate G$a$2 and the relevant GA gates, the immediately following group of four digits is being written into the remaining four storage elements via gate G$b$1 and the relevant GB gates. In this way eight digits are written into the storage elements in the time space of four, and the effect is to increase from one to five digit periods the time displacement between writing in and reading out. (Compare FIG. 3($j$) and ($a$).)

When, with continued increase of propagation delay, the same limit of one digit period displacement is again reached (incoming time slot in time position of FIG. 3($k$)), the delay selector primes gate G$a$1 with a four digit period overlap in which G$b$1 is also primed, and the last delay element DL1 is finally removed. The timing of the incoming time slot at the output of gate G$a$1 is as indicated in FIG. 3($m$), which should correspond to the upper anticipated limit of the propagation delay.

If the propagation delay again decreases, the delay selector will again respond when the original limiting time displacement for decreasing delay is reached, namely when the eighth digit period of the delay incoming time slot S($p$)′ is coincident with the first digit period of the locally demarcated time slot S($t$). The incoming time slot S($p$) will then have the time position of FIG. 3($n$), and the delay element DL1 will be re-inserted (by priming of gate G$b$1 instead of G$a$1) to bring the time slot to the time position of FIG. 3($o$).

It will be seen therefore that with variation of propagation delay in either direction at any time, provided that it is within the upper and lower limits for which provision has been made, the incoming time slot can always be brought into exact time alignment on highway L with a locally demarcated time slot.

Figure 4:
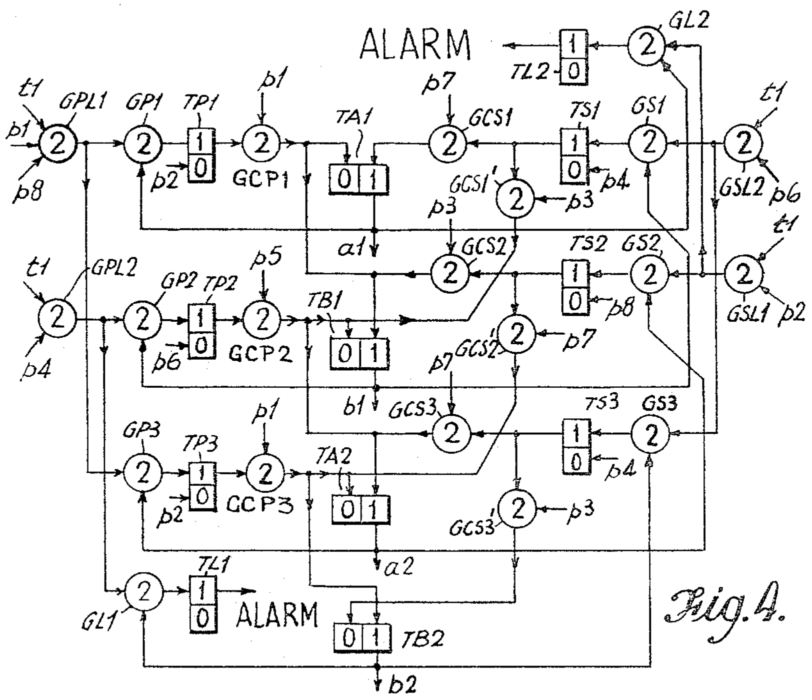
FIG. 4 is a logical diagram of a suitable form of delay selector.

The form of delay selector illustrated in FIG. 4 responds to coincidences between the pulses of certain of the incoming digit period pulse trains $p$1 . . . $p$8 and pulses of one of the pulse trains ($t$1) which as generated by the local timer corresponds to a particular digit period within the locally demarcated time slots. This form of delay selector comprises: a number of bistable elements TA1, TB1, TA2, TB2 (one for each of the gates G$a$1, G$b$1, G$a$2, G$b$2 of FIG. 2); addition priming gates GP1 . . . GP3 with associated output bistable elements TP1 . . . TP3 and addition control gates GCP1 . . . GCP3; subtraction priming gates GS1 . . . GS3 with associated output bistatble elements TS1 . . . TS3 and pairs of subtraction control gates GCS1 . . . GCS3 and GCS1′ . . . GCS3′; limit detecting gates GPL1, GPL2, GSL1, GSL2; and delay limit alarm gates GL1, GL2 with associated output bistable elements TL1, TL2.

Assuming the same initial conditions as for the foregoing description of the operation of FIG. 2 (gate G$b$1 primed so that delay element DL1 is included and FIG. 3($c$) pertains), the bistable element TB1 is initially in its set, or "1," state, in which it primes gate G$b$1 over $b$1 and also primes gates GP2 and GS1. With decreasing propagation delay, the first limiting time position of the incoming time slot is detected by the coincidence at gate GPL2 of a $p$4 pulse with a $t$1 pulse. (Compare FIG. 3($d$) and ($a$).) The resultant output from gate GPL2 sets element TP2 via the primed gate GP2, and the next $p$ pulse ($p$5) sets element TA2 to its "1" state and resets element TB1 via gate GCP2 primed from element TP2. Gate G$a$2 (FIG. 2) is therefore now primed (over $a$2) instead of G$b$1 so that delay element DL2 is additionally included. Also gates GP3 and GS2 (FIG. 4) are now primed instead of gates GP2 and GS1. On the next again $p$ pulse ($p$6) element TP2 is reset. With continuing decrease of propagation delay, the next limiting time position of the incoming time slot is detected at gate GPL1 by coincidence of a $t$1 pulse with a $p$8 pulse. (Compare FIG. 3($f$) and ($a$).) The resultant output from gate GPL1 sets element TP3 via primed gate GP3, and on the next $p$ pulse ($p$1) element TB2 is set via gate GCP3 (primed by TP3) and element TA2 is reset. Gate G$b$2 (FIG. 2) is therefore now primed over $b$2 to bring in delay element DL3.

Assuming that this is the last available delay element, then if the propagation delay continues to decrease, contrary to anticipation, detection by gate GPL2 of the limiting condition represented by coincidence of a $p$4 pulse with a $t$1 pulse can operate an alarm over gate GL1 (now primed from element TB2) and element TL1. If there had been an even number of delay elements instead of the assumed odd number, the alarm condition would have been controlled from gate GPL1 instead of GPL2.

If the propagation delay begins to increase from the condition represented by FIG. 3($f$) and ($g$), in which condition element TA2 is set and gate G$a$2 is primed to include delay elements DL1 and DL2, a limiting condition requiring removal of delay element DL2 is reached in the time position of FIG. 3($h$). This is detected in gate GSL1 by the coincidence of a $p$2 pulse with a $t$1 pulse. (Compare FIG. 3($h$) and ($a$).) The output from gate GSL1, via gate GS2 primed from set element TA2, sets element TS2 which primes gates GCS2 and GCS2′. The next $p$ pulse ($p$3) sets element TB1 via primed gate GCS2, so that gate G$b$1 (FIG. 2) is now primed. For the reason already explained, gate G$a$2 is left primed (that is, element TA2 is not reset) until the $p$ pulse ($p$7) four digit periods later, this pulse $p$7 resetting element TA2 via the primed gate GCS2′. The next $p$ pulse ($p$8) resets element TS2.

In like manner, with continued increase of the propagation delay, gate GSL2 detects the next limit condition by the coincidence of a $p$6 pulse with a $t$1 pulse. (Compare FIG. 3($k$) and ($a$).) The output from gate GSL2, acting via gate GS1 primed from set element TB1, sets element TS1 which primes gate GCS1 and GCS1′. On the next $p$ pulse ($p$7) element TA1 is set to prime gate G$a$1, and on the $p$ pulse another four digit periods later ($p$3) the element TB1 is reset to remove the delay element DL1. This being the last delay element available for removal by the delay selector, subsequent detection of a $p$2 and $t$1 pulse coincidence by gate GSL1, indicating that contrary to anticipation the propagation delay has further increased and the limit condition has again been reached, results in an alarm being given via gate GL2 (primed from element TA1) and element TL2.

The possibility exists that initially the selectively inserted delay will bring the incoming time slot into exact time coincidence with a locally demarcated time slot. As previously explained this is an impermissible time relationship because it would require the digits to be read from the digit stores T1–T8 (FIG. 2) in the same digit period as they are written. Provision may therefore be made for detecting such a condition of initial coincidence and causing a resultant insertion of one delay element so that the incoming time slot, delayed by half a time slot more will then have a leading overlapping but non-coincident relationship with the next locally demarcated time slot, it being always arranged that this latter time slot is the particular one with which the incoming time slot is finally required to be aligned. If it is assumed that, as in the arrangement to be described later with reference to FIG. 8, the delay selector 2 initially opens one of the G$a$ gates rather than one of the G$b$ gates, an initial condition of coincidence can be detected in gate GPL1 of FIG. 4 by the coincidence at that gate of a $p$1 pulse and a $t$1 pulse. Thus if element TA1 has been initially set (gate G$a$1 of FIG. 2 open) this coincidence of a $p$1 and a $t$1 pulse will cause elements TB1 to be set and TA1 to be reset in the manner already described, so that the gate G$b$1 in FIG. 1 is now open instead of gate G$a$1 and the delay of delay element DL1 is thereby introduced. Likewise if element TA2 had been initially set, element TB2 would now be set instead of it. If any one of the TA and TB elements could have been initially set (namely if any one of the G$a$ and G$b$ gates could have been initially opened) gate GPL2 would also be arranged to detect an initial coincidence condition by coincidence at it of a $p$5 pulse with a $t$1 pulse. If to counteract an initial coincidence condition removal instead of insertion of a delay element is wanted, this can be achieved by arranging one or both of gates GSL1 and GSL2 to detect coincidence of a $p$1 or $p$5 pulse (as the case may be) with a $t$1 pulse.

Figure 5:
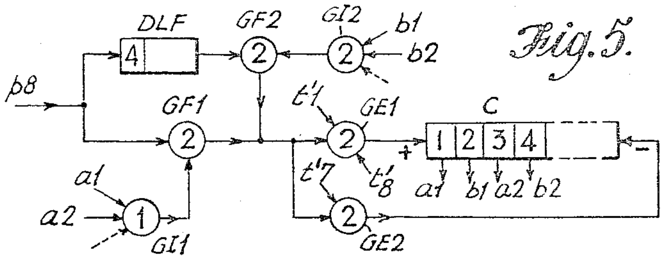
FIG. 5 is a logical diagram of an alternative form of delay selector.

In the form of a delay selector illustrated in FIG. 5, the limit conditions already referred to are detected by coincidence of an incoming synchronising signal, occurring in a particular digit period, with certain of the locally generated digit period timing pulses $t1 \ldots t8$. It is assumed arbitrarily that this synchronising signal occurs in the eighth digit period (namely at $p8$ pulse time) of, say, the twenty-fifth channel.

Referring to FIG. 5 the abstracted synchronising pulse, in the digit period defined by the $p8$ pulse train, is applied to a first gate GF1 directly and to a second gate GF2 via a delay element DLF which affords a delay of four digit periods (half a time slot). The outputs of gates GF1 and GF2 are taken to limit detecting gates GE1 and GE2, of which GE1 detects when insertion of an extra one of the delay elements DL1, DL2, DL3 . . . (FIG. 2) is required, while GE2 detects when removal of one of the delay elements is required. A multi-stage, both-way counter circuit C, from the several stages of which the gates G$a$1, G$b$1, G$a$2, G$b$2 . . . can be respectively primed over $a1$, $b1$, $a2$, $b2$ . . . as before, is preset according to the initial number of delay elements required to be included and is stepped additively or subtractively as the case may be by the outputs from gates GE1 and GE2. One suitable form for this counter will be described later with reference to FIG. 6. The counter may be time-shared by all incoming links on the basis that the interval between the switching of delay elements for the individual links would normally be large. However in view of the number of access gates required and of the additional storage necessary to maintain open the proper gate from the delay chain for each link, this may give little or no saving over the provision of a separate counter circuit for each link. Gate GF1 is primed over $a1$, $a2$ . . ., and GF2 over $b1$, $b2$ . . ., via isolating gates G1 and G2.

Assuming the same initial condition as before, the counter C will have been set to its second stage to prime gate G$b$1 over $b1$ and thereby include delay element DL1 in series with the incoming transmission. FIG. 3($b$) and ($c$) apply. Gate GF2 (FIG. 5) is also primed. With decreasing propagation delay, the first limit condition is detected in gate GE1 by the coincidence of a $t'1$ pulse with the synchronising pulse arriving at this gate with a delay of four digit periods through delay element DLF and primed gate GF2. (Compare FIG. 3($d$) and ($a$).) The counter is therefore additively stepped to prime gate G$a$2 over $a2$ and thereby insert delay element DL2. Gate GF1 is now primed instead of GF2. The next limit condition with continued decrease of the propagation delay is again detected by gate GE1 by coincidence of a $t'1$ pulse with the synchronising pulse, the latter this time reaching gate GE1 through gate GF1 without delay. (Compare FIG. 3($f$) and ($a$).) The counter C is additively stepped again, to prime gate G$b$2 over $b2$ and thereby introduce delay element DL3. Also gate GF2 is again primed (over $b2$), but this is only necessary in the event that DL3, contrary to the present assumption, is not the last delay element available for inclusion. The number of counter stages corresponds to the number of the delay selecting gates G$a$1, G$b$1, G$a$2, G$b$2 . . . .

If the propagation delay decreases from the condition represented by FIG. 3($d$) and ($e$)—in which condition gates G$a$2 and GF1 are primed and delay elements DL1 and DL2 are in circuit—the coincidence of a synchronising pulse with a $t'7$ pulse at gate GE2 (the synchronising pulse arriving via gate GF1) detects that the limit condition of FIG. 3($h$) has been reached. The output of gate GE2 substractively steps the counter C so as to prime gate G$b$1 over $b1$, it being arranged that, for the same reason as before, the priming of gate G$a$2 over $b2$ is not removed until four digit periods later. With delay element DL2 now removed and gate GF2 (FIG. 5) now primed, the propagation delay can continue to decrease until the limit condition of FIG. 3($k$) is reached. This condition is again detected by gate GE2, by the coincidence of a $t'7$ pulse with the synchronising pulse delayed by four digit periods in element DLF (compare FIG. 3($k$) and ($a$)), and the counter is therefore subtractively stepped as before, finally leaving gate G$a$1 primed.

In the event of an initial condition of coincidence between a locally demarcated time slot and an incoming time slot, this coincidence can be detected in gate GE1 by the coincidence of a $t'8$ pulse with a synchronising ($p8$) pulse so that the counter will be additively stepped to insert one of the delay elements for the purpose previously explained. Alternatively a delay element could be removed for the same purpose by arranging gate GE2 to detect coincidence of a $t'8$ pulse with a synchronising pulse. Both of these alternatives assume that initially one of the G$a$ gates is primed: if a G$b$ gate could be initially primed, gate GE1 (or GE2 as the case may be), could be arranged to detect an initial coincidence condition by coincidence at it of a $t'4$ pulse with a synchronising pulse.

At the gates GE1 and GE2 in FIG. 5, $t'$ pulses occurring later in the same digit periods as the corresponding $t$ pulses, as described earlier, are used instead of $t$ pulses, in order to ensure that the counter is not stepped at the same time as a digit is being read from one of the digit stores T1 . . . T8 (FIG. 2).

Figure 6:
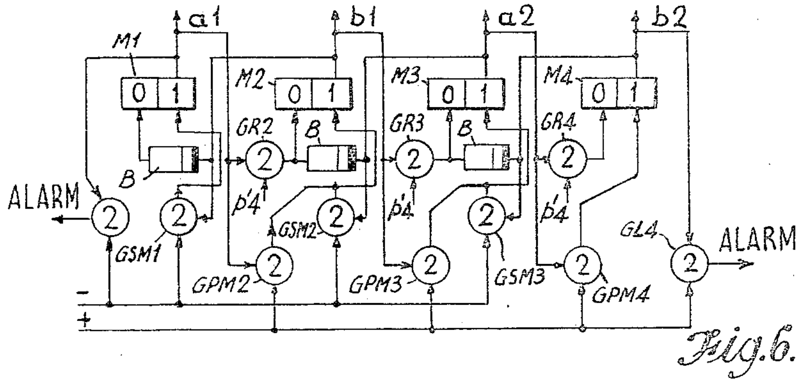
FIG. 6 is a logical diagram of a suitable form of reversible counter for the delay selector of FIG. 5.

In the form of both-way counter illustrated in FIG. 6, the several stages of the counter (assumed to be four) include respective binary elements M1, M2, M3, M4 as their counting elements. The binary elements M2, M3, M4 of the several stages except the first have respective addition input gates GPM2, GPM3, GPM4 each of which has one input connected to the connection marked +, on which signals for additive stepping of the counter are received (namely output signals from gate GE1 of FIG. 5), and another input connected to the binary counting element (M) of the preceding stage so as to be primed by this latter element when it is in its set ("1") condition. The binary elements M1, M2, M3 of the several counter stages except the last also have respective subtraction input gates GSM1, GSM2, GSM3 which have one input connected to the connection marked —, on which signals for subtractive stepping of the counter will be received (namely output signals from gate GE2 of FIG. 5), and another input connected to the binary counting element (M) of the succeeding stage so as to be primed thereby when in its set ("1") condition. In each stage except the last, the binary counting element (M) has a resetting connection via an A.C. coupling element B from the counting element of the succeeding stage so as to be reset when this latter counting element becomes set, while in the several stages except the first the counting elements M2, M3, M4 have respective resetting gates GR2, GR3, GR4 each of which has an input connection from the counting element of the preceding stage so as to be primed from this latter element when in its set condition. These latter gates also receive pulses $p'4$, which occur in the latter half of a digit period four digit periods later than the incoming synchronising pulses and can be derived along with the $p$ pulses in the incoming timer in like manner as the $t'$ pulses are derived with the $t$ pulses. The elements M1, M2, M3 and M4, when set, apply a priming condition over $a1$, $b1$, $a2$, $b2$ respectively.

Stepping of the counter from any particular setting takes place as follows. Let it be assumed that element M2 is set, so that gates GPM3, GSM1 and GR3 are primed. On receipt of an addition signal, only the primed gate GPM3 responds and this causes element M3 to be set, resulting in M2 being reset over the resetting connection between these two elements. The priming of gates GSM1 and GR3 is removed, and gates GPM4, GSM2 and GR4 are primed, so that if another addition signal is received M4 will be set and M3 will be reset in like manner as for elements M3 and M2 previously. On the other hand, if a subtraction signal is received while M3 is set, this signal sets M2 via primed gate GSM2. Gate GR3 is now primed from M2, but element M3 is not reset via this gate until the occurrence of a $p'4$ pulse four digit periods later.

If, when a subtraction signal is received, element M1 is in its set condition (implying that no further delay element is available for removal) an alarm is given via a gate GL3 which receives the subtraction signals and is at this time primed from element M1. Likewise if an addition signal is received when the element M4 is in its set condition (implying that no further delay element is available for insertion), an alarm is given via a gate GL4 which receives the addition signals and is at this time primed from element M4.

Figure 7:
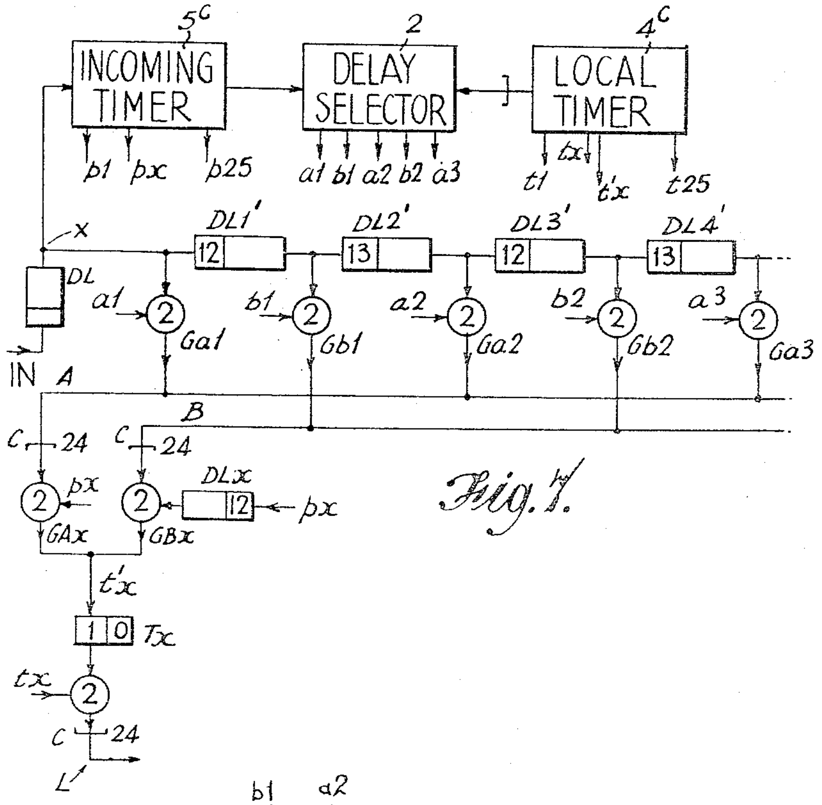
FIG. 7 is an abbreviated logical diagram basically corresponding to FIG. 2 but assuming the "comb" method of information assembly.

Turning now to FIG. 7, this represents in abbreviated form a time alignment arrangement which is similar to that of FIG. 2 but is adapted for a P.C.M. transmission system in which the "comb" method of information assembly is used. Assuming that the system has twenty-five channels of which one is a synchronising channel and the remaining twenty-four are speech or other information channels using an 8-digit P.C.M. code, each time slot will be constituted by 25 digit periods and there will be eight time slots per frame as previously explained. It is also to be assumed that only the information digits of an incoming transmission need to be brought into time alignment with the digit periods of a locally demarcated time slot.

On the latter assumption, instead of the eight storage elements T1 . . . T8 of FIG. 2, twenty-four such storage elements are required (namely one for each information digit period in a time slot) and these are typified in FIG. 7 by the storage element T*x*. The symbols *c* with appended numerals 24 indicate common connections to twenty-four such elements. Gates GA*x*, GB*x* and G*x* associated with element T and typical of groups of twenty-four of each of such gates associated with the twenty-four elements T, correspond in function to the respective groups of gates GA1 . . . GA8, GB1 . . . GB8 and G1 . . . G8 in FIG. 2.

In the chain of delay elements DL1', DL2' . . . each element and its neighbour together afford a delay of one time slot (25 digit periods) and each element itself affords a delay of approximately half a time slot taken alternately to the next lower and next higher integral number of digit periods. That is, as half a time slot is 12½ digit periods the odd numbered delay elements DL1', DL3' . . . afford a delay of 12 digit periods, and the even numbered elements DL2', DL4' . . . afford a delay of 13 digit periods. In this way the difference in timing of digits appearing on the two highways A and B is a whole number of digit periods, so that the same set of pulses (*p*1 . . . *p*24) can be used for writing digits into the storage elements such as Tx via the gates such as GA*x* and GB*x*.

It is now necessary for the gating pulses applied to the gates such as GB*x* to be twelve digit periods behind those applied to the corresponding gates such as GA*x*. To this end appropriate pulses from the pulse sequences *p*1 . . . *p*24 can be chosen as in FIG. 2 or, as shown, the same pulses as applied to a gate such as GA*x* can be applied to the corresponding gate such as GB*x* via a twelve digit period delay element such as DL*x*.

It may be mentioned here that for both the slot and comb method, delay elements each affording a delay of a whole time slot could be used, instead of the half time slot delay elements of FIGS. 2 and 7, if two storage elements were provided per information digit period in each time slot instead of only one, these two storage elements being used alternately and permitting a second digit to be stored before the preceding digit has been read out.

The determination of the total delay initially required to be introduced can be determined by an arrangement such as in FIG. 8. Looking at FIG. 3 again, it will be seen by comparing lines (*c*) and (*a*) for instance that when an incoming time slot is in proper overlapping relationship with a local time slot, the first digit period of the incoming time slot coincides with the preceding local time slot. Thus if the local time slot with which the incoming slot is to be brought into alignment is that defined by the time slot pulses $st_y$ (FIG. 3), the first incoming digit period of this incoming time slot will coincide with the local time slot defined by pulses $st_{y-1}$. In FIG. 8, the time of the first digit period in an incoming time slot is ascertained by the coincidence at a gate GD of a *p*1 pulse from the incoming timer (5) and an $sp_x$ pulse from this timer defining the particular incoming time slot which is to be brought into alignment with the time slot locally defined by the $st_y$ pulses. (For frame alignment $x=y$, that is, the local time slot defined by $st_y$ is that having the same frame position as the incoming time slot defined by $st_x$.) The delay selector outputs *a*1, *b*1, *a*2, *b*2 . . . , none of which is initially primed, are taken via an isolating gate GI' to the inhibiting input of an inhibiting gate GI, which is therefore initially not inhibited. Consequently on coincidence of a *p*1 and $sp_x$ pulse at gate GB, an output from this gate will pass via gate GI to each of a set of gates GS1, GS2, . . . If it is arranged that the first digit period of the $sp_x$ time slot contains the frame synchronising signal, this signal may be abstracted and applied to gate GI directly.

The gates GS1, GS2 . . . also receive from the local timer the time slot defining pulses $st_{y-1}$, $st_{y-2}$ . . . respectively. If therefore the incoming $sp_x$ time slot is already in leading overlapping relationship with the local $st_y$ time slot as required, so that the first digit period of the $sp_x$ time slot coincides with the local $st_{y-1}$ time slot as already explained, the gate GS1 will produce an output at *a'*1 and this is taken to the delay selector to establish an initial setting in which it primes its output *a*1. It is arranged that this condition will arise when the incoming transmission has been subjected to the maximum anticipated propagation delay. If the propagation delay is less than this to an extent such that the *p*1 digit period of the incoming $sp_x$ time slot coincides with the locally defined $st_{y-2}$ time slot, the gate GS2 will produce at *a'*2 an output which is taken to the delay selector to establish an initial setting in which it primes output *a*2. If the propagation delay can be even less, to an extent such as to give coincidence of the $sp_x$, *p*1 digit period with even earlier local time slots, further gates corresponding to GS1 and GS2 can be provided, conditional on sufficient delays being available for selective inclusion. After the delay selector has thus been initially set, gate GI is inhibited and adjustment of the delay selection takes place as necessary according to the principles already described.

The gates and bistable (storage) elements may take any convenient and suitable form. For instance resistance-rectifier or pulse-plus-bias gates may be used, and the bistable elements may be constituted by cross-connected transistor pairs or by magnetic core storage devices, the possibility of using these latter devices depending, however, on their having an adequate speed of response relative to the digit repetition rate. Another possibility for the bistable elements, especially those constituting the digit storage elements, are magnetic film stores. The delay chains may each be constituted by a magnetostrictive delay line which, for arrangements such as those in FIGS. 2 and 7, has a single input (writing) coil and the requisite number of output (reading) coils spaced along it at intervals corresponding to the required delay increments. Alternatively, artificial delay line networks made up of inductance and capacitance components and tapped at suitable points according to the required delay increments, may be used, but the desirability of doing so may be dependent on the required sum total of the delay increments. As all these ways of constituting the various symbolically illustrated elements are very well known, no more detail description thereof is thought to be necessary.

It will be observed that, at several places in the logical diagrams the output connections from two circuit elements are connected in common to an input connection to a third element: for instance in FIG. 4 the output connections from gates GCP2 and GCS1' are both connected to an input connection of bistable element TB1. It will be appreciated that, in known manner, such output connections may have to be provided with isolating means (for example isolating rectifier or so-called "OR" gates) by which an output signal on either of them is prevented from passing along the other back to a circuit element which could wrongly respond to such signal. As persons skilled in the art would provide such isolating means as a matter of course where necessary, these means have not been included in the diagrams.

What we claim is:

1. A transmission receiver for a pulse code modulation transmission system in which digitally coded information is transmitted in successive time frames in time slots each consitituted by a plurality of digit periods, said receiver comprising, for bringing the time slots of a received transmission into time alignment with locally demarcated time slots, delay means affording a plurality of predetermined delays, delay selecting means for selectively connecting in series with an incoming transmission a selection from said delays of total magnitude sufficient to bring the time slots of said transmission into leading overlapping time relationship with respective locally demarcated time slots, storage means following said delay means for temporarily storing digits contained in the digit periods of a received time slot, and means for abstracting said digits from the storage means coincidentally with locally demarcated digit periods.

2. A receiver as claimed in claim 1 wherein the delay selecting means comprises means for detecting variation of the time relationship of the overlapping time slots in either sense from a normal operational relationship and for causing a new selection of said delays to be connected in series with the incoming transmission, whereby to modify the total delay in series with the incoming transmission in the sense to tend to restore a normal operational relationship of the overlapping time slots, in response to a detected variation of a certain magnitude not greater than can be tolerated without risk of mutilation or loss of the digital information stored in the storage means and subsequently abstracted therefrom.

3. A receiver as claimed in claim 1 wherein the delay selecting means comprises means for detecting time relationships of said overlapping time slots which represent limits of variation permissible without risk of mutilation or loss of the digital information stored in the storage means and subsequently abstracted therefrom, and means responsive to the detection of such a limiting relationship for effecting, by connection of a new selection of delays in series with the incoming transmission, a modification of the total delay in series in such sense as to adjust the overlap of the time slots away from the detected limit.

4. A receiver as claimed in claim 1 wherein the delay selecting means comprises means for detecting time coincidence between certain digit periods in the overlapping time slots, being digit periods which will be coincident when the time relationship of said time slots is at a limit of the varation which is permissible without risk of multilation or loss of the digital information stored in the storage means and subsequently abstracted therefrom, and means responsive to detection of such coincidence, according to the particular digit periods which are coincident, for effecting by connection of a new selection of delays in series with the incoming transmission a modification of the total delay in series in such sense as to adjust the overlap of the time slots away from the limit represented by the detected coincidence.

5. A receiver as claimed in claim 1 wherein for selectively connecting in a requisite initial total of the preselectable delays the delay selecting means includes means for detecting the time relationship of a certain digit period in an incoming time slot with respect to the locally demarcated time slots, being a digit period which in the said overlapping relationship between the incoming time slot and a local time slot will coincide with the next preceding local time slot, and for connecting in accordance to the detected time relationship the total of said preselectable delays necessary to bring that certain digit period into coincidence with said next preceding time slot.

6. A receiver as claimed in claim 1 including means providing in series with an incoming transmission, in addition to said preselectable delays, a predetermined delay of such amount that the sum of this additional delay plus the maximum propagation delay anticipated for said transmission approximates to a whole number of time frames.

7. A receiver as claimed in claim 1 wherein the selectively connectible delays afforded by the delay means correspond each to a whole number of digit periods equal to half the number of digit periods in a time slot if this latter number is even and alternately equal to half a digit period more and half a digit period less than half the number of digit periods in a time slot if this last number is odd, whereby the delay selecting means can modify the total delay in series with an incoming transmission by successive discrete amounts averaging half a time slot each.

8. A receiver as claimed in claim 7 comprising a delay chain affording said delays between successive points therealong, a pluarality of selecting gates connected to receive from said points an incoming transmission applied at the first point in said chain, the delay selecting means operating to prime a selected one of said gates according to the number of said delays required to be connected in series with the incoming transmission, a first highway to which alternate ones of said gates are connected in common on their output sides, a second highway to which the remaining gates are connected in common on their output sides, a plurality of digit storage elements for respectively storing the digits in a time slot, first and second sets of gates constituting input gates for the storage elements and connected between them and the first and second highways respectively, means for opening the input gates of said first set at times coincident with respective digit periods in the time slots of an incoming transmission as applied at said first point of the delay chain, means for opening each input gate of said second set at times which are later, by the amount of the delay between the first and second points of the delay chain, than the times at which the other input gate to the same storage element is opened, output gates from the storage elements, with means for opening these latter gates to read their storage elements in respective digit periods of locally demarcated time slots, and means for resetting the storage elements at a time later in the time slots in which they are read.

9. A receiver as claimed in claim 8 wherein the means for resetting the storage elements is effective to reset each element at a time later in the digit period in which it is read.

10. A receiver as claimed in claim 8 wherein the delay selection means comprises a plurality of bistable elements individually settable to respectively prime said selecting gates, a plurality of limit detecting gates for detecting time coincidence between certain digit periods in the overlapping time slots, being digit periods which will be coincident when the time relationship of said time slots is at a limit of the variation which is permissible without risk of mutilation or loss of the digital information stored in and subsequently abstraced from the storage means, said detecting gates including one for each limiting time relationship requiring addition of a delay to maintain the relationship within its limits and one for each limiting relationship requiring removal of a delay, a plurality of addition control gates each operable to set a bistable element and to reset the next preceding bistable element in consequence of detection of a relevant limit condition when said preceding bistable element is in its set condition, and a plurality of subtraction control gates operable to set a bistable element and to reset the next succeeding bistable element in consequence of detection of a relevant limit condition when said succeding bistable element is in its set condition, the resetting of this latter element being effected at a time later than the setting of its preceding element by the amount of the delay between the first and second points of the delay chain.

11. A receiver as claimed in claim 8 wherein the delay selection means comprises a multistage both-way counter having primary connections to said selecting gates from respective stages thereof, first and second gates connected to receive a signal occurring in a predetermined digit period in an incoming transmission, the first with a delay relative to the second corresponding to the delay between the first and second points of the delay chain, connections for opening said second gate from alternate stages of the counter and said first gate from the intermediate stages whereby to pass said signal, and two control gates for stepping the counter in response to coincidence of said signal as passed by said first and second gates with particular digit periods of a locally demarcated time slot, being digit periods with which said signal will coincide when the time relationship of the overlapping time slots is at respective limits of the variation which is permissible without risk of mutilation or loss of the digital information stored in and subsequently abstracted from the storage means, one of said control gates being effective to step the counter additively at limits requiring addition of a delay in series with the incoming transmission and the other being effective to step the counter substractively at limits requiring removal of a delay.

References Cited by the Examiner

UNITED STATES PATENTS

| | | | |
|---|---|---|---|
| 3,069,504 | 12/1962 | Kaneko | 179—15 |
| 3,172,956 | 3/1965 | Inose et al. | 179—15 |
| 3,227,811 | 1/1966 | Hart et al. | 179—15 |

DAVID G. REDINBAUGH, *Primary Examiner.*

ROBERT L. GRIFFIN, *Examiner.*